United States Patent

[11] 3,550,492

[72] Inventor Jerry G. Bechhofer
23 W. 47th St., New York, N.Y. 10036

[21] Appl. No. 607,208
[22] Filed Jan. 4, 1967
[45] Patented Dec. 29, 1970

[54] DATA ENTRY ON DATA PROCESSING MEDIA
6 Claims, 3 Drawing Figs.

[52] U.S. Cl. .......... 83/50, 83/522; 234/13, 234/22
[51] Int. Cl. .......... G06k 1/00; B26f 1/02
[50] Field of Search .......... 83/522, 213, 214, 50; 35/5, 48; 234/13, 22

[56] References Cited

UNITED STATES PATENTS

| | | | |
|---|---|---|---|
| 3,208,160 | 9/1965 | Smith | 35/5 |
| 3,255,536 | 6/1966 | Livingston | 35/48X |

*Primary Examiner*—James M. Meister
*Attorney*—Robert W. Fiddler

ABSTRACT: Means providing a command, preferably in the form of an audio signal informing the operator of equipment for the preparation of data processing media such as punch cards or magnetic tape of the type of information which is to be garnered from the source document for the entry of given data onto the data processing media. Signalling means, such as a tape recorder, is coupled to the data entry equipment, such as a card punch machine, so that the tape recorder will be actuated to play back a signal identifying the portion of the field of the punchcard which has been aligned with the punching mechanism of the punch machine, or the portion of the magnetic tape which has been aligned with the recording mechanism of the tape-encoding device, or any other similar type of data recording apparatus thus minimizing the attention required of the operator, and reliance on the operator's memory.

INVENTOR
JERRY G. BECHOFER
BY Robert W. Fiddler
ATTORNEY

DATA ENTRY ON DATA PROCESSING MEDIA

BACKGROUND OF THE INVENTION

This invention relates to the art of the preparation of data processing media such as punchcards, punch tape or magnetic tape, and more particularly to means for implementing the facility with which an operator of equipment for preparing such media, such as card punch machines used in preparing punchcards may efficiently operate the machine to enter required data on the card.

Though as will become hereinafter apparent, the invention may be employed in conjunction with the preparation of any variety of data processing media in which an operator must select given data from a source document and enter this selected data on the media, the invention will be here described in conjunction with the preparation of punched cards for data processing. Keypunch equipment such as the currently popular IBM 24, IBM 26, or IBM 29 card punches are employed. The equipment serves to punch holes in a card with the position of each hole indicating given data entered on the card. Subsequently, the card may be used in a variety of data processing equipment.

The generally employed punchcard is formed with 80 columns, with one or more columns constituting a subject "-field". Each column has 12 punching areas or zones, one zone for each of the digits 1 to 9, and an area for each of zones 0, 11, and 12. Alphabetical letter information is entered on the card by punching a hole in one of the 0, 11, or 12 zone positions of a given column and punching a hole in one of the digit positions of the given column. One or more columns on the card are employed to enter data of the type to be recorded on the card. Thus, by way of example, a punchcard made up in connection with sales accounting applications would include a "field" constituted by one or more columns on the card in which given information relevant to the desired accounting procedure is entered. A typical sales accounting card would include a field for the customer's name; one for a customer number; a field for location or address; salesman's identification field; a date field; a quantity field; an item identification field; and an invoice amount field. Each of these fields is normally set up to correspond to the items of information to be entered on an invoice, which will be prepared by the use of the data processing card.

The conventional card punch machine for making these cards, such as the IBM 24 card punch, comprises a card hopper in which a stack of cards is maintained in position for feeding one card at a time to a punching station in which a punching mechanism punches the desired holes in the card in the columns of the card aligned with the punching station. A card shifting mechanism moves the card to bring different columns into registry with the punching mechanism. To facilitate the entry of punches in different fields on the card, a program unit is provided which automatically controls the movement of the card past the punching station. The movement of the card can be controlled by use of the program unit to effect automatic skipping, duplicating, and shifting between columns so as to bring given columns into registry with the punching mechanism. Operation of the program unit is controlled by means of a program card which is mounted on a program drum which is mounted for rotation in the program mechanism. A sensing mechanism positioned adjacent the drum is actuated depending on the holes punched on the program card on the drum, to control the feeding of cards past the punching station. In order for the operator to know which column of the card is in registry with the punching mechanism, a column indicator is provided which serves to identify to the operator the particular column in registry with the punching mechanism.

In preparing the data cards, the operator, after setting up the punch machine by arranging a supply of blank cards in the card hopper of the machine, and positioning a program card on the program drum, is ready to enter the requisite data on the punchcard. This is done by the operator reading the desired data from a source document and actuating the keys of the keyboard which energize the punching mechanism to punch holes in the card in registry with the punching mechanism. The operator must perform four steps, namely:

1. Look at the column indicator to determine the column of the card in registry for punching, or recall the column of the card in position for punching at any given moment;
2. Remind herself of the nature of the field indicated by the columns;
3. Select the requisite information from the source document which is to be entered into the field of the card in which punching is being done; and
4. Actuate the keyboard to produce the requisite punch.

For any group of cards being processed, the keypunch operator will be dealing with the same types of information on each of the cards. The card, which is provided with the requisite fields to accommodate the types of information, is fed through the machine either as a result of control by the operator or by the program drum so that these fields come up seriatum. In observing a keypunch operator in action, it is noted that the more efficient operators develop a high degree of speed, and in order to do so, often find it necessary to talk out loud to themselves reminding themselves of the field of the card with respect to which information is to be garnered from the source document. As the number of fields on the card increase, the operator is slowed down by having to remind herself of the field with which she is dealing.

Although many skilled keypunch operators reach a high degree of dexterity, the speed of their punching is slowed down by the necessity of having to think constantly of the sequence in which they must punch. Good design procedures require that the format of the source document and the card be compatible, so that reading of the source document from left to right and from top to bottom follows the sequence of field position on the card. However, even when there is a near ideal state of card-source compatibility, the operator is still burdened with having to remember and identify the field in which punching is being done. The more of a particular application a keypunch operator punches, the more proficient she becomes, and the necessity of relating source information to punching information reduces to a point at which the keypunch operator's actions are almost automatic, as a result of which errors are considerably reduced.

At this point, another problem arises in that the sheer boredom of continuously having to punch the same type of information produces a slowdown and loss of interest in the job. For this reason, and due to the fact that those organizations with relatively small keypunch staffs find it desireable to switch punching chores between operators, it is desirable to permit keypunch operators to do a variety of jobs. As a result, the incidence of error increases, and the rate of speed decreases.

A further problem arising in developing errorless speed by a keypunch operator is the fact that keypunch rooms are relatively small, and the noise produced by the operation of the machines is relatively great. The noise of machines, and any movement by the operators or others in the keypunch room serves to distract the operators, interfering with their ability to correlate data from the source document with the manipulation of the keys.

SUMMARY OF THE INVENTION

According to the invention, the above discussed problems are eliminated by providing means serving to minimize the effort required of an operator in selecting the required information for entry onto the media. As here described, the invention is disclosed for use on card punch equipment to aid in correlating the information on the source document with the field of the punchcard in registry with the punching mechanism of the keypunch machine. This serves to eliminate the effects of distractions produced by noise and movement in the keypunch room, and permits an operator to change between different keypunching jobs without a loss of efficiency.

It is, accordingly, among the primary objects of this invention to provide means improving the efficiency and accuracy with which the operator of equipment for preparing data processing media may enter requisite data on the media.

A further object of the invention is to provide means reducing the mental effort required by a keypunch operator in preparing a punchcard.

It is also an object of the invention to provide means eliminating external distractions from interfering with the operations of a keypunch operator.

These and other objects of the invention, which will become hereafter apparent, are achieved in accordance with the invention by coupling command signaling means, preferably a sound reproducing device, such as a tape recorder, with the keypunch machine, so that the movement of a given field of a data processing card into registry with the punching mechanism of the keypunch machine or other data entry means will actuate the sound reproducing mechanism to produce a signal identifying the field of the card in position for the entry of desired data. By this arrangement, the burden of the operator in identifying the particular field in position for data entry, and the burden of memorizing the fields of the card are substantially eliminated. The commands, which an operator heretofore had to give herself with respect to the actions to be taken, are now provided by the tape recorder.

BRIEF DESCRIPTION OF THE DRAWING

The specific details of a preferred embodiment of the invention, and their mode of functioning, will be particularly pointed out in clear, concise and exact terms in conjunction with the accompanying drawing wherein.

DESCRIPTION OF THE PREFERRED EMBODIMENTS

Figures 1, 2, 3:
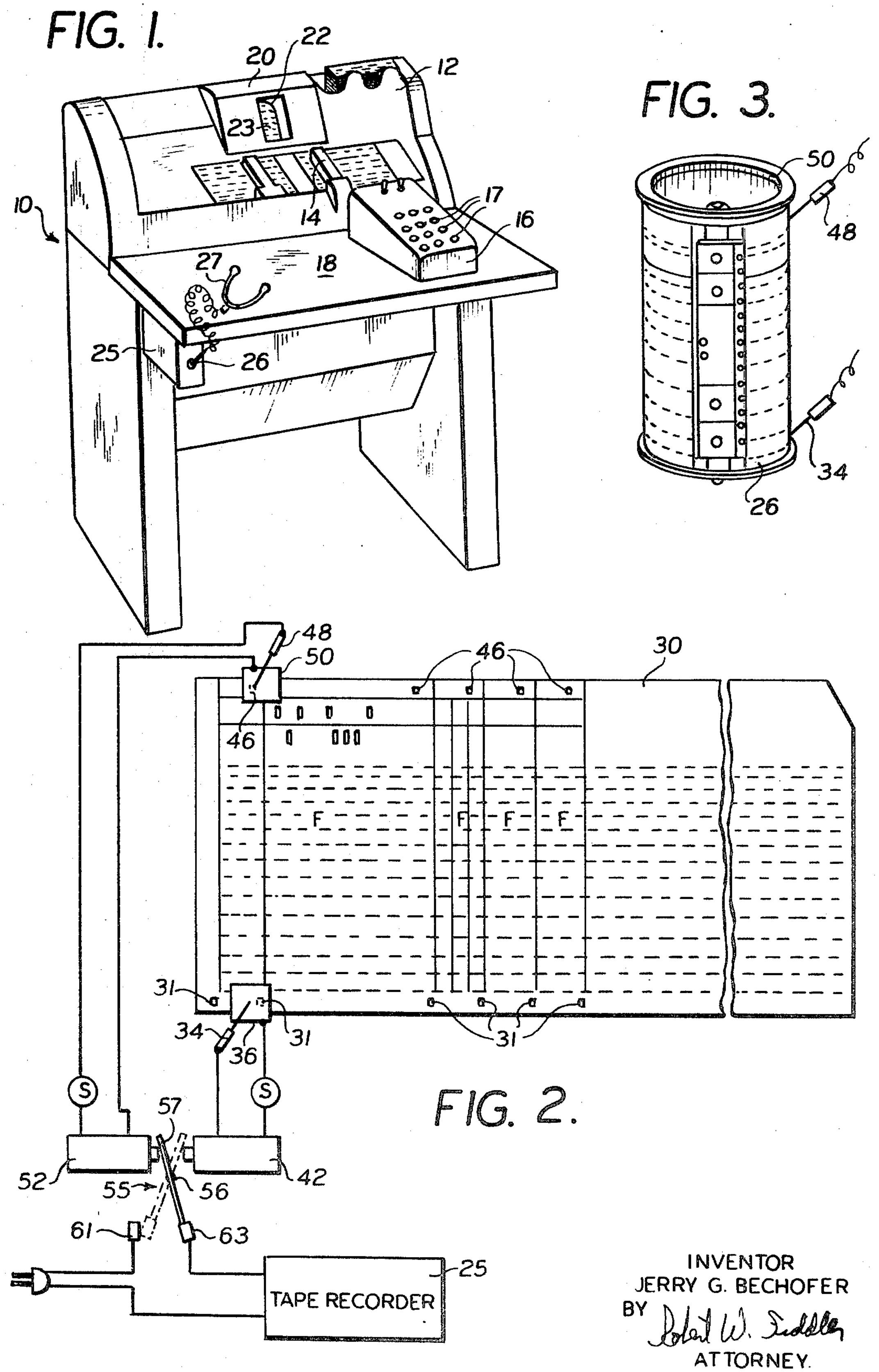
FIG. 1 is a perspective view of a typical card punch machine showing a suggested arrangement for practicing the invention.
FIG. 2 is a schematic sketch illustratively indicating a proposed electromechanical arrangement for coupling a signaling mechanism, such as a tape recorder, with a keypunch machine.
FIG. 3 is a schematic perspective view of the program drum modified to permit practice of the invention.

Referring now more particularly to the drawing, like numerals in the various FIGS. will be employed to designate like parts.

As illustratively shown in FIG. 1, a card punch 10 is shown of a type like the IBM 24 card punch, having a card hopper 12 in which a stock of data processing punchcards is maintained to permit feeding of the cards one at a time to the punching station 14. The keyboard 16, having appropriate keys 17, is shown as arranged in conventional fashion on the right-hand side of the reading board 18 arranged to support the source documents from which the operator is garnering information for entry onto the punchcards. A program unit 20, as is conventionally provided, is shown at the upper center of FIG. 1 in which a program drum 22 is mounted for rotation. As will be understood by those skilled in the art, the program drum 22 supports a program card 23 for actuating switches to control circuits affecting the feeding of cards through the punch machine.

To the above described conventional features of a card punch machine, applicant has added signaling means in the form of a tape recorder 25, which is preferably secured to the chassis of the machine at a point providing easy accessibility to the tape recorder without interfering with access to the card punch machine. As illustratively shown in FIG. 1, it is proposed to secure the tape recorder 25 to the left-hand underside of reading board 18. The tape recorder may be of any of a wide variety of types, and the specific details of the tape recorder, in and of themselves form no part of the invention. However, it will be recognized by those skilled in the art that the tape recorder is preferably selected of a type in which a tape loop may be played. The tape loop should be of a length to accommodate signals identifying all of the fields which may possibly be used on a punchcard. A loop recorder with two minutes of playback time is found adequate for most situations. The recorder is preferably provided with an earphone jack receptacle 26 in which an earphone assembly 27 may be connected to receive the playback signal from the tape recorder. Additionally, the tape recorder should be selected of a type permitting ready access to the tape transport circuitry, so that desired on-off switching of the circuitry may be attained.

As illustratively shown in the schematic illustration in FIG. 2, the conventional data card 30 is illustrated as provided with a plurality of fields in which punches are to be made.

In accordance with the illustrated embodiment of the invention, the card 30 is formed with a plurality of lower marginal punches 31, each punch 31 being formed at a point slightly in advance of each field F on the card.

A sensing brush 34 is mounted to wipe over the upper surface of card 30, with the end of the brush engaging in punch 31. Positioned beneath the path of movement of the card, and arranged for contact with the end of brush 34 is a contact bar 36. The engagement of the contact bar 36 by brush 34 is employed to actuate the tape recorder 25, which may be one of any of a variety of conventionally available types as above discussed. To this end, there has been illustratively shown in FIG. 2 an arrangement whereby contact between the sensing brush 34 and contact block 36 may be employed to actuate the tape recorder 25. According to the illustrated schematic arrangement, this is accomplished by coupling brush 34, and contact bar 36 into a circuit with relay solenoid 42, hereinafter referred to as the on-solenoid. The on-relay circuit, including brush 34 and contact bar 36 is coupled to an appropriate current source indicated by the circled S so that when the brush 34 contacts the contact bar 36, the on-solenoid 42 will be energized.

A second set of punches 46 is preferably formed at the upper margin of the card 10, as illustrated in FIG. 1, with these punches 46 serving to permit completing a circuit to shut off the tape recorder, as will become hereafter apparent. The top row of recorder shutoff punches 46 are arranged at points along the upper margin of the card 30 at intervals spaced between the lower marginal punches 31. For each punch 31, there is a corresponding punch 46.

Mounted for wiping over the upper margin of card 30 into engagement with punches 46 is a sensing brush 48. Beneath the path of movement of the card 30, and aligned with the punch 46 for engagement by the end of brush 48, is a contact block 50. Brush 48, contact block 50, and solenoid relay 52 hereinafter referred to as off-relay are arranged in a circuit with an appropriate current source S as indicated schematically in FIG. 2, so that when punch 46 passes beneath the free end of brush 48, a circuit is completed to off-relay solenoid 52 to energize same.

Though a variety of switching arrangements may be employed for energizing, and deenergizing the tape recorder in accordance with the position of the punch card 30, according to the illustrated embodiment of the invention, it is contemplated that a switch arm 55 may be pivoted as a simple lever on pivot 56, with the free end 57 of the switch arm 55 extending between the poles of the relay solenoids 42 and 52, with the free end 57 formed of a material subject to magnetic attraction by the solenoids 42 and 52 when the solenoids are energized. A fixed contact 61 is arranged in the circuit to the tape recorder, and a movable contact 63 is positioned on the other end of switch arm 35 for movement into engagement with fixed contact 61 to complete the circuit to the tape recorder.

As will be apparent to those skilled in the art, in lieu of having each punch card formed with punches 31 and 46, it is possible to form only the program card mounted on the program drum of the conventional punch machine with the tape recorder on and off punches 31 and 46 respectively. Where the program drum of the card punch is utilized, as seen in FIG. 3, it will be understood that the brushes 34 and 48 and the respective contact blocks 26 and 50 are arranged with respect to the program drum. It is preferred that the upper and lower edges respectively of the program drum be employed as the contact blocks 26 and 50 by connecting the upper and lower edges of the drum into the circuit to the relay solenoids 42 and 52 respectively.

It will, of course, be apparent to those skilled in the art that instead of forming the upper and lower edges of the drum as contact blocks, brushes 34 and 48 may be replaced by the feeler arms of microswitches which are arranged in the circuits to the solenoids to control actuation of the tape recorder.

OPERATION

In practicing the invention, the conventional punch machine, such as the IBM 24, 26 or 29 punch machine is provided with a tape recorder, preferably of the loop type as above discussed, providing for a playback time of 2 minutes. Appropriate electrical connections are made between the tape recorder and the card punch so as to control operation of the tape transport mechanism of the tape recorder in accordance with the movement of a card through the card punch. A circuit arrangement, as shown illustratively in FIG. 2 may be employed to effect coupling of the card punch and tape recorder to obtain desired tape playback in coordination with card position.

The tape loop to be played back on the tape recorder has signals recorded on it corresponding to the fields of the card to be punched. Thus, by way of example, for an invoice accounting operation, the tape loop has recorded on it signals identifying fields for customer's name, customer number, address, salesman's identification, date, quantity, item identification, and invoice amount. In order to avoid delay between signals, and to make maximum utilization of the tape, it is preferred that the entire tape be recorded. Thus, it may be necessary to record the tape with several groups of signals identifying the fields. It will, of course, be apparent to those skilled in the art that the groups of signals must be commensurate with the tape so that the entire series of signals will be given without overlap.

The tapes with the requisite commands may be prepared by anyone. However, it is often of advantage to permit the operator to prepare her own command signals so as to enable her to incorporate desired instruction and cues in accordance with her personal preferences.

The recorded tape is positioned for playback on the reels of the tape recorder, and the operator is in position to actuate the keypunch.

Where the program drum is being employed, the program card is formed with the requisite on-off punches to actuate the tape recorder.

Where the program drum is not being used, each of the cards is previously punched with on-off punches for the fields. These punches may be formed simultaneously with the printing of information on the card or at any other time, as desired.

In use, the operator proceeds as she would normally proceed in operating the keypunch, however, she is now provided with the benefit of having commands given to her automatically as a given field of the card comes into position beneath the punching station of the keypunch, and she does not have to rely on her memory or any other auxiliary sources to refresh her recollection as to the desired data which she must garner from the source documents.

It is thus seen that a simple technique has been provided whereby an operator is relieved of the burden of having to memorize the fields of a card or the information to be entered on tape or other data processing media, and may readily change between different operations involving different types of data entry without significantly impairing her efficiency. Additionally, the operator avoids distraction by external noise or movement in the keypunch room.

The above disclosure has been given by way of illustration and elucidation, and not by way of limitation, and it is desired to protect all embodiments of the herein disclosed inventive concept within the scope of the appended claims.

I claim:

1. Equipment for the preparation of data processing media having different fields in which different data is to be entered, said equipment comprising: data entry means; means for moving the media on which the data is to be entered into registry with said data entry means; a program drum on which a marked program card is mounted; means rotating said drum; sensing means reading the markings on the marked card on the drum; signalling means forming part of said equipment; control means for said signalling means, said sensing means coupled to said control means to actuate said signalling means when the media on which data is to be entered is moved to a data entry position to provide a signal indicative to the operator of the field of the media in position for the entry of data.

2. Equipment, as in claim 1, in which the program card is formed with punches acting on said sensing means coupled to said signal control means.

3. Equipment, as in claim 1, in which the data processing media being prepared comprises punchcards formed with indicia in advance of each field of the card; sensing means in the path of movement of the card contacting said indicia, said sensing means coupled to said control means.

4. Equipment, as in claim 3, in which the indicia on the cards are punches.

5. A method of implementing the use of equipment for the production of data processing media, said method comprising the steps of: providing a data processing card with switch actuating means in advance of each field of the card in which entry of data is to be made; arranging a switch control member in the path of movement of the card to the data entry position of the equipment; coupling the switch in a circuit actuating a signal producing mechanism; providing said signal producing mechanism with recorded media subject to being presented upon actuation of said mechanism, said media indication the type of information to be entered on the media following the production of the signal, whereby the equipment operator is cued as to the information to be entered.

6. A method, as in claim 5, in which the card with the switch actuating means is positioned on a program device of said equipment.